United States Patent
Picchietti

[11] Patent Number: 5,871,116
[45] Date of Patent: Feb. 16, 1999

[54] FOOD SERVICE AND STORAGE FOODSTUFF HOLDING CONTAINER ASSEMBLY

[76] Inventor: Romana Picchietti, 1455 Shermer Rd., Northbrook, Ill. 60062

[21] Appl. No.: 850,206

[22] Filed: May 2, 1997

[51] Int. Cl.$^6$ .................................................. B65D 25/08
[52] U.S. Cl. ..................... 220/501; 220/4.24; 220/522; 220/529; 220/575
[58] Field of Search ................... 220/4.24, 4.25, 220/4.21, 526, 575, 571, 501, 503, 504, 521, 522, 525, 529, 23.83, 23.86; 366/130

[56] References Cited

U.S. PATENT DOCUMENTS

| | | | |
|---|---|---|---|
| 1,764,039 | 6/1930 | Cooper | 220/4.25 |
| 3,292,810 | 12/1966 | Schechter | 220/4.24 |
| 3,485,416 | 12/1969 | Fohrman | 220/4.24 |
| 3,487,972 | 1/1970 | Swett | 220/526 |
| 5,358,330 | 10/1994 | Moll . | |
| 5,575,848 | 11/1996 | Chedville | 220/501 |
| 5,676,272 | 10/1997 | Baerenwald | 220/4.24 |

*Primary Examiner*—Stephen Castellano
*Attorney, Agent, or Firm*—Sidney N. Fox

[57] ABSTRACT

A food service and storage foodstuff holding container assembly formed of pair of matched open-faced upper and lower dishes and an interconnecting member having a perforate floor, the upper dish containing a foodstuff and the lower dish containing a liquid. The interconnecting member is frictionally seated within the lower dish. The upper dish is inverted and frictionally engaged with the interconnecting member to form the container assembly. Oppositely opening wells are carried along the periphery of the interconnecting member, a bead formation is within each well. The rim of the dishes seat within the wells while the interconnecting member is frictionally seated within the dishes, the bead formation tightly engaging the rims to supplement the frictional engagement of interconnecting member and the dishes, maintaining such engagement from unwanted disassembly. Once assembled, the container is inverted without separation of the dishes, even if shaken. The liquid from the lower dish passes through perforate floor into the upper dish, forming a mixture. The upper dish is separated providing access to the mixture. Covers are provided for the individual dishes for applicant before or after disassembly of the container. The container assembly can be packaged assembled or as a kit providing the plural disassembled elements in a single package for selective interchangable use.

18 Claims, 3 Drawing Sheets

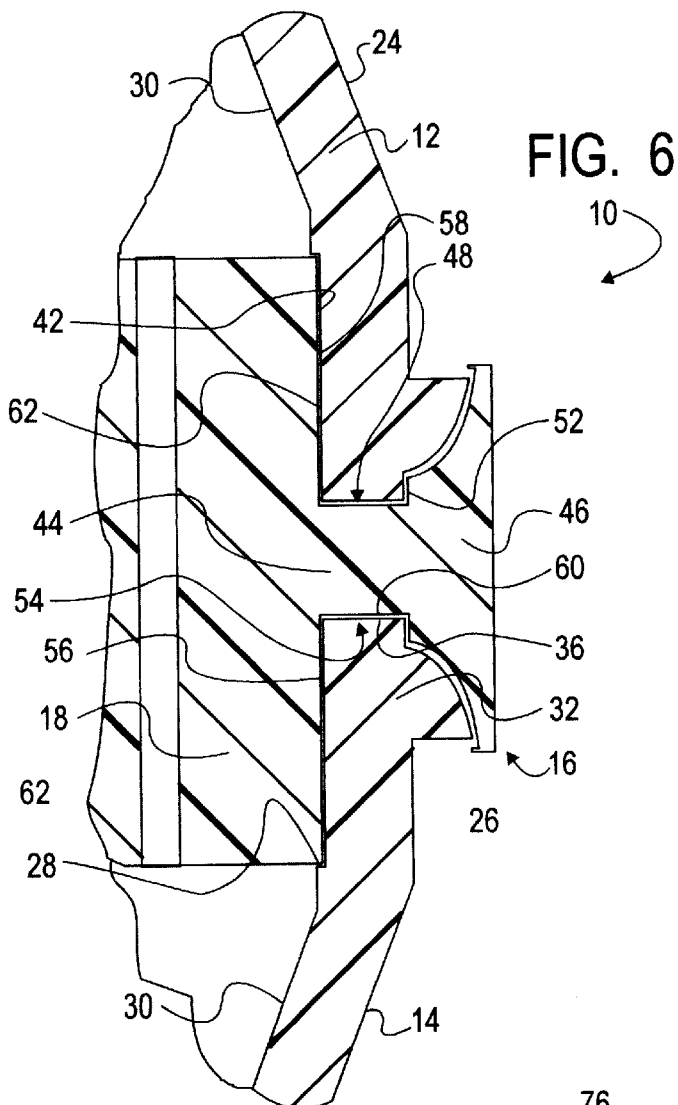
FIG. 6
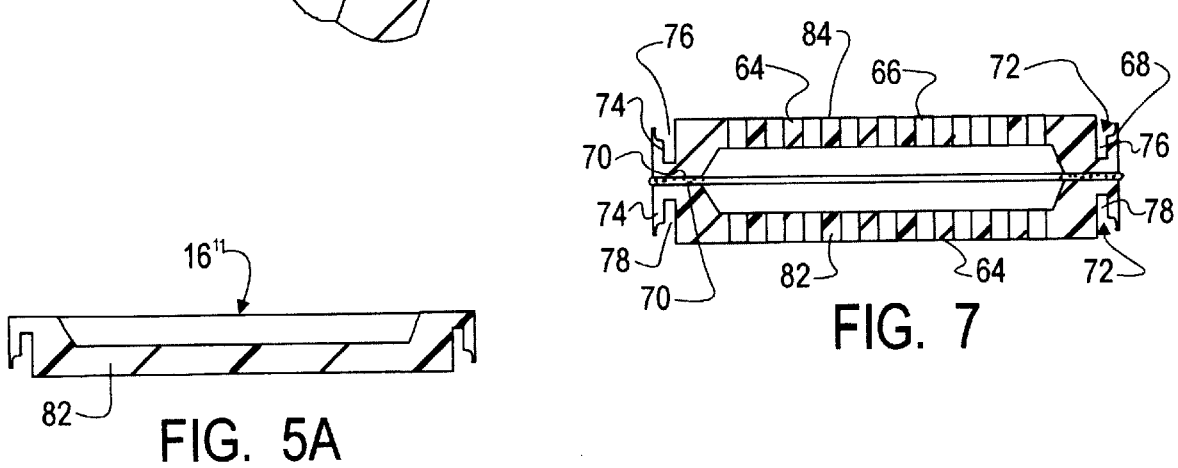
FIG. 5A
FIG. 7

FOOD SERVICE AND STORAGE FOODSTUFF HOLDING CONTAINER ASSEMBLY

FIELD OF THE INVENTION

This invention relates generally to multicompartment food service and storage foodstuff holding container assemblies and particularly is directed to providing a reusable, twin compartment food service and storage foodstuff holding container assembly for serving and/or storing wet or dry foods, especially for use as take-with on site lunches such as used at schools and at the workplace; one compartment holding the food while the other compartment can hold condiments or can be empty to enable decanting liquids from the wet foods by inverting the container to transfer the liquids from the one compartment to the other compartment.

Many individuals prepare food at home for later consumption on the job or for children's lunches for consumption at school. So called "bag" lunches conventionally consist either of a sandwich of "cold-cuts", fruit, cereal, cookies, etc. Food, such as sandwiches, apples, oranges, bananas and the like do not require vessels for holding same prior to consumption thereof, so that a paper bag is sufficient for carrying the "lunch" to the job or to school, the bag being disposable once the lunch has been consumed or can be folded and reused.

Recently, much public attention has been directed toward providing both adults and children with healthier foods than the conventional "bag" lunches. Prepared foods, salads, fish, such as tuna, are suggested healthier replacements. Such "healthier" lunches most often require the food to be placed in separate covered containers. Other lunches can consist of a salad, conventionally placed in a separate covered container. Liquid salad dressing often is placed in another covered container capable of accommodating liquid salad dressing, for example. The salad and salad dressing can be mixed during preparation the lunch instead of on site. However, often this is not convenient and, as well, the salad can become soggy and unappetizing. Fruit salad will contain liquid juices, also requiring another separate covered container.

Tuna, salmon and crab meat, for example is conventionally purchased as canned goods, generally small in size when intended for luncheon consumption. Such canned foods contain water, oil or similar "juices" which most often must be decanted prior to consumption. Such canned goods, must be mechanically opened using the trustworthy can-opener. The latter activity most often takes place in the home kitchen and handling is known to create a "mess", during the opening thereof and due to spillage during necessary decanting of the accompanying liquids. Such spillage is difficult to clean-up and produce a disagreeable odor unless immediately cleaned-up. The food also must be transferred from the opened can to a container which must be tightly covered. Such transfer also results in additional spillage of the food and/or any residual juices. Other "healthy-eating" foods such as fruit salad also containing juices further involve spillage and further, require containment in a separate covered container; transfering from a larger container to a limited size portion smaller container also often results in spillage which requires immediate clean-up. Fresh salads most often have either added liquid salad dressings or are accompanied by separate portion containers of liquid salad dressings.

Many other so-called "healthy-eating foods" are prepared just prior to their placement in convenient carrier containers and require availability of preparation time, as well as the presence of liquids, such as juices, etc., which must be accommodated to assure tastiness as well as freshness.

Individuals often must prepare lunches at home, generally in the early morning, prior to departure for work and/or the children's departure for day-care or school. Mornings for an individual and/or for a family often are hectic, since breakfasts must be prepared and consumed, individuals must prepare for the day, i.e. wash, dress, etc. Time is limited and, of course, of the essence.

The "hasty lunch" conventionally fails to meet the guidelines for "healthy eating". The preparation and packaging of more "healthy" luncheon foods generally require more time than is available, often is a messy experience, requiring the avoidance of spillage and the clean-up of spills that nevertheless occur, cleaning the utensils used, etc before leaving for work or school or attending to other household tasks which must be accomplished before departure.

Additionally, consumption of a "healthy type" lunch on site can require more time than the consumer is allowed for that purpose. For example, consumption of canned tuna either from the can thereof or from a carrying container in which the tuna is placed after the can had been opened, most often requires decanting of the packing juices, e.g. water, oil, etc. before consumption, and/or requires use of a fork which inconveniently requires draining each forkful as one takes portions from the conventional containers, and, too, requires excessive time as well as likely creating a "mess", plus "clean-up". occasionally, juices are desirable when accompanying consumption of the food. At other times, the juices are retained in the lunch containers so as to maintain their freshness and taste. However, most often, when one is ready to consume the food, say at school or the workplace, one wants to separate the solids from their juices prior to consuming the solids. Not only must one carry a receptacle for such discarded juices or search for same on site, sometimes vainly, but the decanting of such juices, on site, most often results in spillage, which must be cleaned-up on site.

It would be highly desirable to avoid such problems, yet maintain a healthy and appetizing food program. Consumption of such foods as pasta (requiring separate containers for sauce), fruit salads (often with excess juices at least some of which require draining), vegetables (again requiring draining of juices, whether the vegetables are cooked or packaged and/or consumed uncooked), all are most often inconvenient to package and to carry to a site, and to consume on site.

In addition to providing a solution to the problems described, the structure of a compartmentalized twin food service and storage foodstuff holding container assembly should be relatively simple so as to facilitate loading, unloading and easy clean-up after use.

Further, construction of the compartment food serve/storage container should be such as to be formable of material which enables warming or minimal cooking time on site without damage, such as physical distortion. The compartmentalized container desirably can be formed of microwavable material so that it can be placed in a microwave oven and heated therein without distortion.

The twin compartment food service and storage foodstuff holding container assembly also should be reusable and, in addition to the advantages discussed, should be constructed to facilitate quick assembly as well as disassembly. Additional covers may be presented to enable use as a pair of independent containers.

The prior art has disclosed many examples of multicompartment container constructions, including nesting containers, but these examples are not directed to or believed suitable for the food serve/storage container purposes, as will be discussed hereinafter.

Several prior patents are of interest. These include Clark, U.S. Pat. No. 5,083,674 (1992); Fairchild et al., U.S. Pat. No. 4,883,935 (1989); Grenell, U.S. Pat. No. 4,444,324 (1984); DeLong, U.S. Pat. No. 4,027,779 (1977); Schwarze, U.S. Pat. No. 5,425,196 (1995) as well as the German Patent specification No. 4213266-A1 (1993).

Clark discloses a two compartment container for epoxy adhesives, the container being formed of upper and lower generally cylindrical cups, each having a removable cover. The base portion of the upper cup is bonded to the cover of the lower cup. Each of the covers have a circumferential rim provided with an radially outwardly extending peripheral edge portion. The rim of each cup has an outwardly extending circumferential ledge spaced from the upper edge of said cup rim and adapted to define a seat for the rim of the cup. The outer edge of each cup is provided with a circumferential bead frictionally engagable with the rim of the cup for closing off the lower cup and its contents, i.e. the upper cup and the lower cup being tightly joined defining the twin compartments. Each cup is intended to contain one of a two part epoxy resin, the other cup containing the other of the two part epoxy resin, generally one part being the epoxy resin, the other being the "activator". Of course, the upper cup is covered. When the epoxy composition is to be used, the cups are separated and the contents of the upper cup is poured into the contents of the lower cup and mixed therewith, providing the activated epoxy resin, ready for use. The upper cup can be provided with a handle to enable carrying same to the site of use, the upper cup carrying the resin while the lower cup holds the activator and the cups are both covered. The bonded cover serves as the connecting element and is permanently fixed to the base of the upper cup.

Fairchild et al has directed attention to the problem of providing a microwavable package having a top open-faced portion and a bottom open-faced portion, the top portion being sealed to the bottom portion in face to face relationship. The bottom portion includes an interior region having a sealed opening while the upper portion also has a sealed opening. The interior region of the bottom portion holds wet contents, such as sauce, chicken, meat, etc. An "easy open" metal end member is double-sealed over the interior region of the bottom portion and a seam ring is introduced to facilitate opening to that interior region. A metal ring is snap-fitted over the mouth of the bottom portion and covers the metal end of the upper portion of the said bottom portion to prevent arcing in the microwave.

Fairchild's unit's upper portion has a frustum-like configuration and has a outwardly protruding lip terminating in a flange carrying vents. The interior of the upper portion is adapted to contain food which is not intended to be warmed by microwave and is sealed. A metal ring is seated over the top end of the lower portion and the lip of the upper portion is fitted onto the rim of the lower portion with the upper portion inverted. A shrink band binds the two rim portions together. The package now is complete.

In use, the upper and lower portions are separated by fracturing the shrink band, both portions remaining sealed. The seals are broken and the respective contents are accessed and mixed. The upper portion is replaced, covering the lower portion and the reassembled package is heated in the microwave, thereafter consumed.

The Fairchild et al container unit requires much manipulation, including breaking of seals, accessing and mixing the contents—thereby likely resulting in spillage. Breaking of the sealing shrink band is required, as is reassembly, calling for more manipulations. The type of food content is limited. Again, while coming close to meeting the desirable construction, the Fairchild et al teachings lead to a point of sale commercial package suitable only for single use, and does not provide a twin compartment container which can be used simply as a container, say for lunches or snacks, and reused as such.

Grenell teaches the provision of a pair of cylindrical rings, each having threaded interior open ends. An interconnecting member has a pair of opposite exterior threaded closure rings unitary therewith. Likewise, a pair of end covers, also provided with threaded rings, and are threadably engagable with the open cylindrical ends of the tubes. The tubes are placed end to end, linked together by the respective threaded ends threadably engaged with the closure rings of the connecting member, thereby forming the "package unit". The covers as well as the disc member can be insulated. The Grenell directs attention to a similar problem facing the applicant but fails to provide for communication between compartments of the resulting twin compartment container and hence does not enable decanting of the juices from the contents of one container to the other container, as desired by applicant. The structure of the Grenell unit precludes providing for such decanting, except by separating the containers.

DeLong teaches the provision of a pair of nesting cup-like containers, one a cup with a handle and the other being an open-top cylinder having a intermediate wall, the cylinder including a depending unitary depending reduced diameter portion constructed to nest within the open top of the cup. The intermediate wall can be partially perforate. If imperforate, the unit can be used with the cup containing hot coffee and the smaller chamber of the other container serving to hold cream. With the intermediate wall being perforate, tea may be contained in the cup while a lemon wedge can be contained in the smaller chamber, the user squeezing the lemon wedge to introduce same into the tea through the perforated wall. Again, the DeLong combination does not function to meet the utilization sought to be satisfied by applicant.

Schwarze provided a pair of threaded caps or lids permanently secured to like closure lids by rivets. The caps are threadably secured to jars which are used as fishing bait carriers. There is no provision for communication through the caps between the jars. The combination as taught by Schwartz is believed not suitable for the purposes or the functions heretofore discussed.

The German patent specification is directed to the provision of connecting means for joining a series of open-ended bottles in sealed end to end arrangement by connector units having inner circumferential grooves and the bottles having circumferential beads for receipt within said grooves. Again, the net arrangement would not satisfy the functional requirements sought by applicant.

The invention is intended to solve the problems experienced by a homemaker or worker in the course of preparing so-called "sack" lunches for children to be carried to school and/or for family members to be carried to places of employment.

Accordingly, the invention particularly provides a twin compartment food service and storage foodstuff holding assembly which can serve both as a serving unit and a storage unit. The twin compartment container is easily loaded with food that is considered healthy. Such food can be "wet" including liquids such as juices in which the food is packaged, fruit and other salads carrying either natural juices or packaged with juices such as fruit salad, other salads which contain liquid such as salad dressings to be added just prior to consumption, vegetables (cooked or uncooked), even cereals (dry or wet) and similar foods which are considered part of a healthy diet as distinct from "cold-cuts" such as ham, hot dogs, jelly, cold meats, or the like in the form of sandwiches. In order to satisfy the desire to provide food for consumption on site at school or at the work-place which food meets the criteria of "healthy eating" yet which must be prepared in the early morning routine of getting children and other family members getting ready to leave the home for school or work. There is little time in the early morning for the preparation of lunches at home. As early mentioned, adults must wash and dress, young children must be awakened, washed and dressed, breakfast must be prepared, last minute emergencies must be met . . . all the while, the home-maker must clean dishes, wipe up commonly occuring messes perform the myriad household chores..commonly get personally ready for work at a job. Rush is the controlling word.

The task must be simplified for the purpose at hand. For this purpose, the service and storage foodstuff holding container assembly provided is formed by assembling a pair of like open-faced dish members by inverting one dish of the pair, inserting an interconnecting disc member within the open face of the other dish and coupling the inverted dish sealingly with the assembled dish member. The lunch food is quickly introduced into the one dish prior to the assembly of the interconnecting member thereon. If the lunch food is wet, that is contains liquids which requires draining, the interconnecting member employed is perforate and the other dish is empty when assembled to the interconnecting member.

The assembled twin compartment service and storage foodstuff holding container assembly can be easily and safely carried, to the school or to the work place. When lunch-time comes, the assembled container (carrying the lunch food) simply can be inverted, whereby the liquid content thereof is drained into the empty compartment of the assembled container. Access is gained to the food by disassembling the container, lifting the food carrying dish from the inverted assembly along with the interconnecting member. The now drained food is retained by the interconnecting member, the dish carrying same returned to its upstanding condition and the interconnecting member removed. The mess conventionally experienced such as spilling having been avoided and, the odious smell of the discarded juices also is avoided. Each fork full of the food can be accessed without the liquid dripping therefrom or the necessity necessity having to drain each forkful as one takes bites from the conventional container in the course of eating the food.

The interconnection member can be perforate, for draining purposes, or, alternatively, can be imperforate, serving simply additionally as a cover. When the perforate interconnecting member is employed, food such as dry cereal can be placed in one dish, and the interconnecting member inserted thereinto. Milk, for example, is placed in the other, the lower dish and the container is assembled. When the time for eating arrives, the assembled container is inverted to allow the milk to drain through the perforations of the interconnecting member and and mixes with the dry cereal. When an imperforate interconnecting member is utilized in lieu of the perforate interconnecting member, the dry cereal can be placed in one of the dishes while the milk is placed in the other of the dishes. Since both compartments are sealed one from the other by the imperforate interconnecting member, the twin compartment container is assembled and is carried with the upper compartment carrying the dry cereal and the lower compartment carrying the milk. When access to the food is desired, the assembled container and the interconnecting member are separated from the lower dish. The cereal containing dish is uncovered by removing the interconnecting member therefrom. Now, the cereal can be added to the milk from the lower dish.

One must avoid creation of messes along with ease of handling, and enabling the carrying of wet or dry foods to an eating site. Convenience, versatility, reusability as well as the provision of take-with lunches with food that is included in the "eat-healthy" regime characterize the basic benefits of the food service and storage foodstuff holding container assembly achieved by the invention. Of further advantage, the food service and storage foodstuff holding container assembly is easily cleaned and is reused.

SUMMARY OF THE INVENTION

The invention provides a reusable multicompartment food service and storage foodstuff holding container assembly comprising a pair of like dishes adapted to be coupled sealingly to an interconnecting disc member seated within one dish and provided with means to establish a sealed engagement with the other dish. One dish can be loaded with a wet food, the interconnecting member introduced thereon to establish a sealed connection with the one dish, and the other dish can be inverted and engaged sealingly upon the interconnecting disc. The interconnecting member can be perforate, whereupon, when the loaded container is inverted to drain the liquid from the first compartment defined by the food carrying dish, through the perforate member. The container is disassembled so that the dish carrying the drained food can be accessed without creating a mess, etc, avoiding the necessity for cleaning any environmental spillage. The used dishes and interconnecting member are cleaned and reused.

It should be noted that the food service and storage foodstuff holding container assembly according to the invention lends itself to packaging in the form of a forming kit having its elements available for selective interchangable use; i.e. plural, individual open-faced dishes, the interconnecting member and the plural covers being provided in a single package.

BRIEF DESCRIPTION OF THE DRAWING

FIG. 5A is a sectional view of a cover member employed to cover one of the dishes for protecting and transporting the contents (not shown);

FIG. 6 is an enlarged fragmentary sectional detail of the assembled food service and storage foodstuff holding container assembly of FIG. 4, illustrating the engagement of said interconnecting member with dish members thereof; and, FIG. 7 is a vertical sectional view of a modified interconnecting member of a further modified embodiment of the food service and storage foodstuff holding container assembly according to the invention;

DESCRIPTION OF PREFERRED EMBODIMENTS

Figure 1:
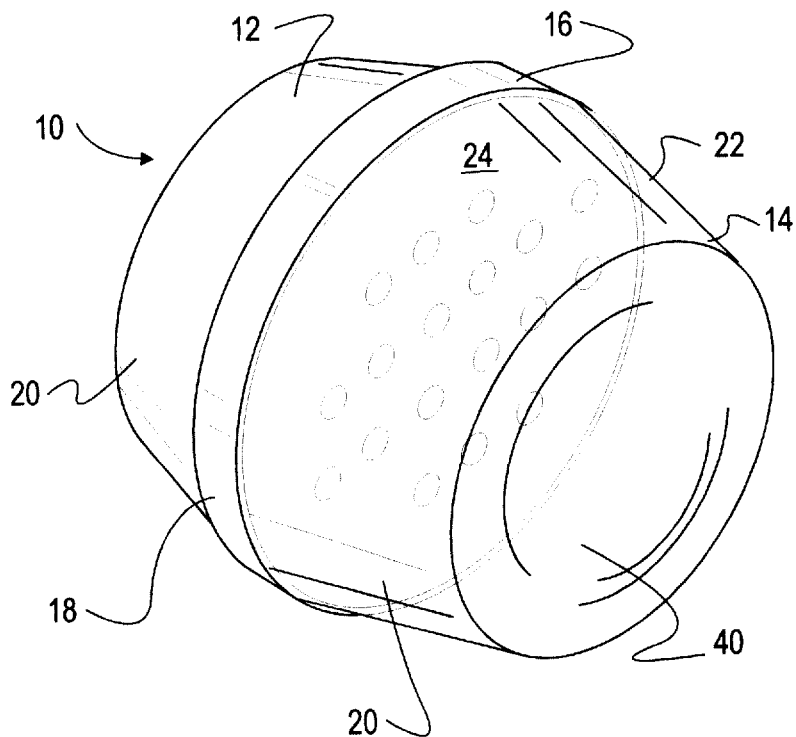
FIG. 1 is a perspective view of the assembled twin compartment food service and storage foodstuff holding container assembly according to the invention.
Figure 2:
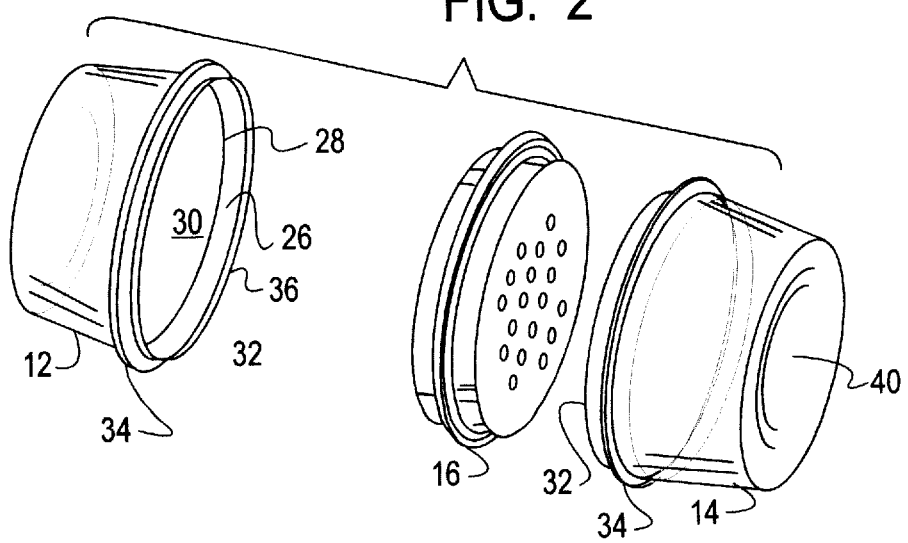
FIG. 2 is an exploded view of the twin compartment food service and storage foodstuff holding container assembly according to the invention with the elements thereof viewed in perspective.
Figure 4:
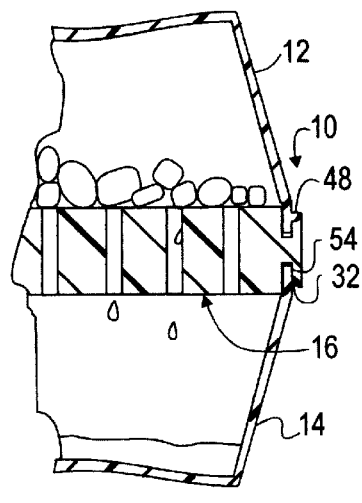
FIG. 4 is a cross-sectional fragmentary vertical view of the assembled twin compartment food service and storage foodstuff holding container assembly according to the invention illustrated in FIG. 3 but in inverted condition during which the liquid content of the wet food illustrated in FIG. 3 is shown in the process of draining.

Referring to the drawings, in FIG. 1, the food service and storage foodstuff holding container assembly according to the invention is designated by reference character 10 and consists of a pair of open-faced dishes 12,14 arranged sealingly coupled respectively to an interconnecting disc 16. The interconnecting disc 16 has a cylindrical body 18 having a diameter sufficient to be frictionally, sealingly received through the open face of dish 14 and frictionally, sealingly within the open face of dish 12 when dish 12 has been inverted and seated therewith. Each dish 12, 14 is of frustum configuration, having a circumferential wall 20 having band 22 along the outer surface 24 of the circumferential wall 20 which defines a circumferential recess 26 and a circumferential ledge or shelf 28 along the inner circumferential surface 30 of wall 20 of each dish 12,14. The circumferential wall 20 of each dish 12,14 terminates in a circumferential rim 32. An outwardly extending planar downwardly extending narrow flange 34 is formed along the outer circumferential surface 24 of wall 20. The flange 34 extends outward at a location spaced from the tip 36 of the rim 32 and defines a circumferential groove 38 (see FIGS. 4 and 6). Both containers 12,14 can have an inwardly directed hemispherical floor or base 40. A dish having a relatively planar floor is described hereinafter and shown in FIG. 5.

The interconnecting member 16 is a disc having a cylindrical body 18 having a circumferential wall 42 and a circumferential rib 44 of T-shaped configuration, the cross-portion 46 of the rib 44 defining, with the wall 42, a pair of oppositely opening circumferential wells 48,50, each having circumferential corner beads 52,54 within the respective wells 48 and 50 so as to define respective narrow annular grooves 56,58.

The body 18 of the interconnecting disc 16 is sufficiently thick so that the respective outer circumferential walls 42 will extend within the respective dishes 12 and 14 frictionally engaging the inner surfaces of the interior recesses 26 of the inner circumferential wall portions 30 and the tips 36 of the rims 32 of the dishes 12,14 bottom within the respective grooves 56,58, with the surface portions 60 of the rims 32, frictionally engaged with the corner beads 52,54 and the inner walls 62 of the wells 48,50 when both dishes 12,14 are engaged within the respective wells 48,50 of the interconnecting disc 16 defining the sealed engagement of the dishes 12,14 and the interconnecting disc 16.

The interconnecting disc 16 preferably can be formed of slightly resilient material which can "give" slightly to form a tight fit between the rims of the dishes and the interior surface portions of the wells.

The food service and storage foodstuff holding container assembly 10 of the invention is assembled by seating the interconnecting disc 16 within the open-face of the dish 14 and thereafter inverting dish 12, seating same on the exposed section of the interconnecting disc 16, with the rim 32 thereof engaged fully sealingly within the facing well respectively 48,50 of said disc 16.

Preparation of a lunch and packaging same for use at a site such as school or the workplace, can proceed as follows, utilizing the food service and storage foodstuff holding container assembly 10 of the invention. The assembled container 10 is disassembled, with the dishes 12 and 14 being uncovered. Solids and/or wet luncheon foods such as tuna, lunch meats, cheese, or the like, fresh or left-overs, are introduced into the open-faced dish 12, which now defines the food holding compartment when assembled subsequent to loading thereof with luncheon food. The dish 12 then is covered by seating the disc 16 thereon to establish a frictional sealed engagement thereof. The empty dish 14 then is assembled frictionally sealably to the disc 16 with the rim 32 of dish 12 engaged fully sealably within the appropriate well 48,50.

If the occasion demands, the selected interconnecting disc 16, which is perforate, is employed thereby enabling the assembled food service and storage foodstuff holding container assembly to be inverted for the purpose of draining the juices or water from the foodstuff within dish 12 into the dish 14. After drainage is completed to the satisfaction of the consumer, the dish 12 along with the disc 16 is separated from the dish 14, leaving the drained juices or water within said dish 14. The disc 16 then can be lifted from the dish 12 and removed therefrom, enabling access to be gained to the drained foodstuff so as to enable the consumer to partake thereof using a suitable utensil, such as a spoon or fork (not shown). No mess would be encountered because spillage is avoided. The individual dishes 12 (now empty) and 14 as well as disc 16 now can be washed and dried for reassembly and/or reuse.

When an imperforate cover 16", such as represented in FIG. 5A, is employed either dish 12 or 14 can function as the food carrying dish, with one of the dishes 12 or 14 used to contain foodstuff such as dry cereal, and the other dish holding milk for adding to the dry cereal at the time of consumption.

Figure 5:
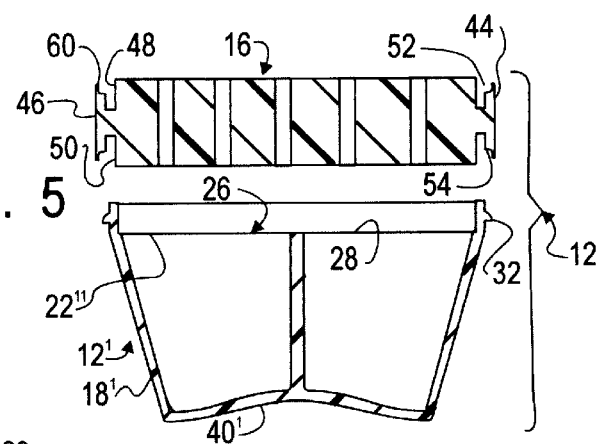
FIG. 5 is a diagrammatic sectional exploded view of one dish of a modified food service and storage foodstuff holding container assembly according to the invention illustrated with an interconnecting member arranged to be applied thereto.

The dish 12' illustrated in FIG. 5 is represented with an interconnecting member 16" which may be imperforate, may function as a cover for either dish 12 or 14, so that the content may be transported, such as described above with respect to the imperforate cover shown in FIG. 5A. The dish 12' has a flat floor 40' and a circumferential wall 18'. The dish 12' also has a circumferential inner ledge 28 the dish 12'. As shown in FIG. 5, the dish 12' is illustrated as provided with a unitary generally vertical cross-bridging wall 18" dividing the dish 12' into two compartments. As shown, the height of the cross-bridging wall 18" extends from the base of the dish 12' to a point such that the cross-bridging wall 18" is non-interferent with said interconnecting member 16 fully inserted therewithin. In each case, the covered dish 12' can be used for storing the portioned foodstuffs both prior to and during transit of the same to the chosen site for consumption as will be described hereinafter.

One or both of dishes 12,14 and 12' can be molded of suitable flexible plastic such as polypropylene, polyethylene; or, of more rigid plastic materials. One or both of dishes 12,14,12' and the interconnecting members can be formed of heat-resistant microwavable materials, to enable the foodstuff to be heated in a microwave oven, for convenience.

Modified interconnecting means (not shown) of the type represented by interconnection member 16, can also be formed in a configuration such as will enable a bayonet type-connection (not shown) with the respective open-faced like dishes, so long as the connections when made are frictionally sealed against leakage.

Of course, several additional individual lids or covers can be supplied additional to the dishes and interconnecting means individually sealably frictionally to cover the dishes.

Referring to FIG. 7, an alternate interconnection member such as disc 16' can be formed by adhesively securing a pair of lids or covers 64, each of which has a floor portion 66 and a circumferential wall 68. The circumferential wall 68 is provided with a planar rim 70 extending outward therefrom. The covers 64 are arranged face to face, with the planar rims 70 thereof aligned and facing each other. Adhesive is applied to the facing planar rims 70 and the adhesive coated rims 70 are engaged surface to surface. The adhesive is allowed to dry so that a cylindrical interconnecting member is formed with the rim edges 70 defining a pair of spaced circumferential ribs 72, each of which has a L-shaped flange represented by reference character 74, said flanges 74 effectively defining the rib means and grooves 76,78. Each of the grooves 76,78 which serve to define the equivalent well pairs 48,50 carried by the resulting interconnecting member 16' have a corner bead unitary with an inner wall of the grooves such as the beads 52,54 described in respect of interconnecting member (disc) 16 in FIG. 6.

Figure 3:
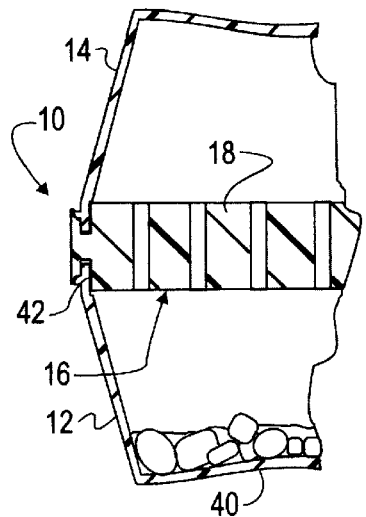
FIG. 3 is a cross-sectional fragmentary vertical view of the assembled twin compartment food service and storage foodstuff holding container assembly according to the invention illustrated loaded with a portion of wet lunch food.

The resulting interconnecting member 16' is hollow, and, if the lids 64 are imperforate, and if desired, prior to the adhesive adherence of said rims together, insulating material can be introduced into the covers 64, thereby to provide insulated separation between the individual compartments of the resulting twin compartment serve/storage container. The floor portions 82,84 of the covers or lids 64 can be perforate (broken lines) or can be imperforate, when perforate, may function similar to the interconnecting member 16 in FIGS. 3 and 4 serving either to permit the resulting disc 16' to enable drainage of juices therethrough. When imperforate, the interconnecting member 16' can function as a cover for one of the dishes to facilitate transport of the foodstuff therein or simply may function enable the disc 16' to define a pair of separate sealed compartments one, say for example, for containing food and the other to contain additives such as milk, gravy, salad dressing or solids for addition to the food contained in the other compartment at the time of consuming of such contents.

Discs 16 or 16' can be formed as solids as by molding technique and their thickness, diameter and/or configuration can vary depending upon the dishes selected.

Figure 8:
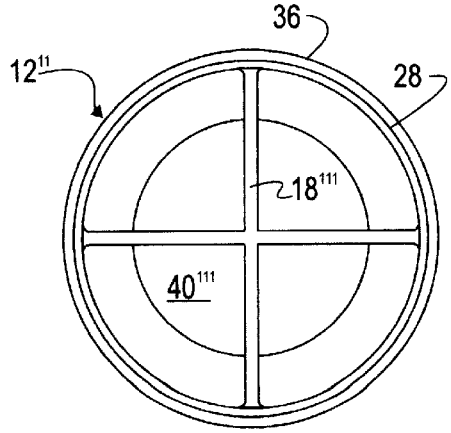
FIG. 8 is a top plan view of a modified perforate dish element of a further modified food service and storage foodstuff holding container assembly according to the invention; and, FIG. 8A is a fragmentary partial sectional perspective view of the interconnecting member illustrated in FIG. 3 as mounted upon the four compartment open-faced dish illustrated in FIG. 8.
Figure 8A:
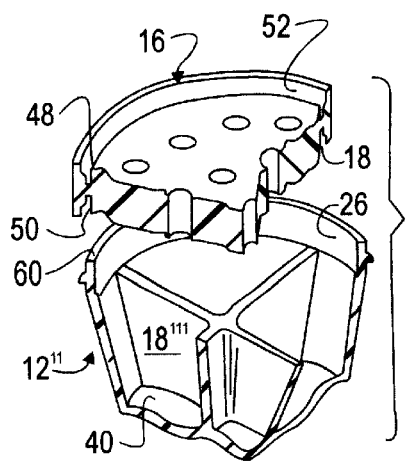

In FIG. 8, a dish 12" representing a modified embodiment of the invention is illustrated, this dish 12" is provided with interior dividing or bridging walls dividing the interior thereof into four independent compartments which when dish 12" is assembled with another dish form the assembled container. The height of the cross-bridging walls 18''', like the wall 18", extends from the base 40 of the dish to a point such that the cross-bridging walls 18', 18" and 18''' are non-interferent with the interconnecting member 16 when same is fully inserted within the open-faced dish enabling interconnecting member 16 when fully inserted within the open-faced dish a sealed engagement can be made interconnecting 16 member.

The dishes 12,14 and their similar equivalents that have been specifically described herein need not be cylindrical or of frustum configuration but may be formed of oval or polygonal, i.e. rectangular, square, etc. and the interconnecting member must have dimensions and configurations complementary to the open face of the particular dish selected so as to fit therein engaging the inner walls of the dish frictionally sealingly. The pair of dishes can range in size or depth so that when assembled, containers of different interior volume can be established.

The perforations of the interconnecting members can be formed when the interconnecting members such as the type represented by the imperforate cover are formed and punched out or, may be the result of piercing with a sharp pointed instrument such as a pointed object, a thick needle or even a knife, so long as the perforations are of a size so that the liquids such as juices can drain therethrough.

It should be understood that the use of the food service and storage foodstuff holding container assembly of the invention enables the preparer and the consumer to enjoy eating what is considered "healthy lunches", rather than be limited to the commercial "fast food" variety. The foodstuffs can consist of all types of salads, with suitable salad dressings; cooked and dry cereals, with milk and the like conveniently stored for mixing; meat products with juices; fruits and fruit cocktail, with their packing juices; fish or poultry; vegatables, both cooked and raw; all are available for site consumption by children at school and/or adults at work can be prepared at home and safely carried to school or to the workplace. This is made possible utilizing the container according to the herein disclosed invention. Many attempts heretofore have been made to provide a "carry-out" type container for the purposes discussed herein, but none have been provided which are characterized by the ease and versatility of usage enabled through use of the above described invention. It should be understood following the discussion of the individual elements of the food service and storage container assembly, that these elements can be made available in the form of a packaged kit wherein there is provided, in a single package, plural open-faced dishes preferably in pairs, the interconnecting member and plural covers wherein these elements are available for assembly into the food service and storage container. The plural open-faced dishes, alternatively, may include those dishes having interior cross-bridging generally vertically oriented walls. As a kit, the package will contain all the elements described for forming the the food service and storage food holding container. No longer will one be required to find a place to drain juices from carry-in lunches; no longer will the consumer be required to search for empty cups to deposit liquid drained from the lunch food; no longer will one who wants to separate the more solid foodstuffs from their juices be limited by the inability to fulfill such desires while those individuals who want the juices or packing oils to be retained with the foodstuffs be limited to juice-free foodstuff with the option of decanting or retaining such juices or packing oils from a carry-in container being denied. One will be able to provide individual portions, say of salad dressing, for example, for addition on site to the salad . . . no separate bottles or other containers being required.

It is contemplated that ones skilled in the art can conceive variations in the construction and assembly of the invention without departing from the spirit and/or scope of the herein invention as claimed.

I claim:

1. A food service and storage foodstuff holding container assembly for use in containing foodstuff and comprising:
   a. a pair of like open-faced dishes having respective side-walls, at least one of said open-faced dishes adapted to carry a foodstuff, one of said open-faced dishes being invertable to arrange said dishes face-to-face, and cover members suitable for covering and uncovering said open-faced dishes when said open-faced dishes are disassembled, each of said open-faced dishes capable of being selectively covered and uncovered, each of said open-faced dishes having a rim along the upper edge thereof and coextensive therewith;
   b. an interconnecting member of size and configuration for frictionally, sealingly engagement with said side-walls within each of said face-to-face arranged open faces of said open-faced dishes, said interconnecting member defining at least a pair of interior compartments, said interconnecting member having an outer wall and a perforate floor;
   c. said outer wall of said interconnecting member carrying outwardly extending rib means formed thereon and coextensive therewith and pairs of outwardly oppositely opening wells formed in said rib means;
   d. each of said wells having a base and bead means formed interior of said wells;
   e. each of said wells and bead means being formed of size and configuration for receiving said rims of said open-faced dishes sealably engaged therewithin tightly against said bead means;
   f. said interconnecting member being capable of seating frictionally sealingly within one of said open-faced dishes with the perforate floor thereof extending across the face thereof and said rim retained tightly against said bead means within one of pair of wells and the other one of said open-faced dishes being invertable and engaged sealably with the outer wall of said interconnecting member, said rim of said other of said open-faced dishes being seated sealingly within said other of said pair of wells of said interconnecting member with said rim thereof tightly against said bead means thereof forming said container assembly defining at least a upper and lower compartments separated by said perforate floor;
   g. said assembly being invertable for draining at least a portion of the foodstuff of said one open-faced dish into said other open-faced dish through said perforate floor and being capable of manipulation while maintaining said frictional sealing relationship thereby forming a mixture with the content of said other dish;
   h. thereafter, said assembly being capable of selective disassembly permitting access to the mixture formed therein.

2. The food service and storage foodstuff holding container assembly according to claim 1 in which at least one of said open-faced dishes is formed with at least one generally vertical interior cross-bridging wall unitary therewith, said cross-bridging wall dividing said one of said open-faced dishes into at least a pair of interior compartments, said cross-bridging wall extending from the base of said one of said open-faced dish to a point such that cross-bridging wall is non-interferent with said interconnecting member when same is fully inserted within said one of said open-faced dishes.

3. The food service and storage foodstuff holding container assembly according to claim 1 in which said at least one of said unassembled open-faced dishes is intended to be covered and uncovered on site prior to assembly.

4. The food service and storage foodstuff holding container assembly according to claim 1 in which said rib means comprise an outwardly extending shallow flange formation having said pairs of oppositely outwardly opening wells formed therein, said bead means formed of a bead formation located proximate to said base thereof.

5. The food service and storage foodstuff holding container assembly according to claim 1 in which said interconnecting member comprises a body having an exterior side-wall and a pair of spaced parallel ribs extending along said side-wall thereof, said ribs including a flange formation defining, with said side-wall, said pairs of oppositely opening wells, said wells capable of receiving frictionally sealably said respective ones of said rims of said open-faced dishes when said interconnecting member is frictionally sealingly seated within said arranged open-faces of said open-faced dishes.

6. The food service and storage foodstuff holding container assembly according to claim 1 in which said said rib means comprise a flange formation defining, with said side wall, said oppositely opening wells and said bead means.

7. The food service and storage foodstuff holding container assembly according to claim 1 in which at least one of said open-faced dishes includes cross-bridging intersecting interior generally vertical walls defining plural interior compartments within said one of said open-faced dishes, said cross-bridging intersecting walls extending from the base of said open-faced dish to a point such that said cross-bridging intersecting walls are non-interferent with said interconnecting member when same is fully inserted within said open-faced dish.

8. The food service and storage foodstuff holding container assembly according to claim 1 in which said foodstuff is capable of being carried by said open-faced one of said open-faced dishes is a dry-foodstuff, and said other one of said open-faced dishes is adapted to contain a liquid-foodstuff, said interconnecting member being capable of arrangement seated frictionally sealingly within the open face of said one of said open-faced dishes, said one of said open-faced dishes with said interconnecting member adapted to be inverted and frictionally sealingly engaged within the open face of said other one of said open-faced dishes, and said open-faced dishes with said interconnecting ember being capable of being inverted to effect drainage of said liquid-foodstuff through said perforate floor of said interconnecting member into said dry-foodstuff containing one of said open-faced dishes forming a mixture thereof and thereafter reinverted to remove excess liquid-foodstuff from said mixture and capable of disassembly gain access to said drained mixtures.

9. The food service and storage foodstuff holding container assembly according to claim 1 in which said interconnecting member is a disc.

10. The food service and storage foodstuff holding container assembly according to claim 1 in which said rib means comprise an outwardly extending shallow T-shaped flange, the cross-piece thereof defining, with said outer wall of said interconnecting member, said pairs of oppositely opening well formations with said bead means capable of receiving the rims of said open-faced dishes when said open-faced dishes are arranged face to face frictionally sealingly engaged with said interconnecting member.

11. The food service and storage foodstuff holding container assembly according to claim 1 in which said open-faced dishes are intended to be covered by one of said cover members whereby the respective contents thereof can be stored for transport.

12. The food service and storage foodstuff holding container assembly according to claim 1 in which said other one of said open-faced dishes is adapted to contain a liquid, said open-faced dishes both intended to be covered prior to formation of said container assembly and uncovered for formation of said container assembly, said interconnecting member adapted to be frictionally sealably seatable within said one of said open-faced dishes, and said one of said open-faced dishes with said interconnecting member adapted to be inverted while retaining said foodstuff and adapted to be seated within said liquid containing other one of said open-faced dishes and both said open-faced dishes with said interconnecting member capable of being together inverted effecting drainage of the liquid from said other of said open-faced dishes into said one of said open-faced dishes forming a mixture of the contents thereof.

13. The food service and storage foodstuff holding container assembly according to claim 1 in which said other one of said open-faced dishes is intended initially to be empty, said open-faced dishes are adapted to be covered prior to formation of said container assembly and uncovered for formation of said container assembly, said interconnecting member intended to be frictionally sealingly seated within said foodstuff containing one of said open-faced dishes with said rim thereof sealably seated within one of said wells of said interconnecting member, said other one of said open-faced dishes is intended to be inverted and frictionally sealably seated with said rim thereof within other one of said wells of said interconnecting member, said open-faced dishes with said interconnecting member engaged therewith is intended to be inverted effecting drainage of said foodstuff from within said one of said open-faced dishes into said other one of said open-faced dishes, and thereafter being disassembled to gain access to the drained foodstuff retained within said one of said open-faced dishes.

14. The food service and storage foodstuff holding container assembly according to claim 1 in which said bead means comprise a unitary bead formed on a wall defining well at a location along the length thereof proximate said base within said well.

15. A food service and storage foodstuff holding container assembly forming kit, said kit comprising:

a) at least a pair of matched open-faced dishes, each having a side-wall, said side-wall having a rim along the upper edge thereof coextensive therewith;

b) an interconnecting member of size and configuration to enable frictional engagement within the open face of said dishes, said interconnecting member including an outer wall frictionally engagement with said side-wall, said outer wall carrying outwardly extending rib means coextensive therewith and a pair of oppositely opening wells formed in said rib means coextensive therewith and each of said wells having a base; unitary bead means formed as a bead formation interior of said wells, said wells being of size, depth and configuration for receiving said rims therein sealingly engaged tightly against said bead means, said interconnecting member having a perforate floor extending across the face of said open-faced dishes when engaged therein;

c) plural cover members suitable for engagement with said open-faced dishes;

each of said matched open-faced dishes, interconnecting member and plural cover members being available for selected use;

at least one of said open-faced dishes being selectable to contain a foodstuff and the other of said open-faced dishes selectable to contain a liquid, said interconnecting member being selectable for sealing engagement with said liquid-containing open-faced dish and with the foodstuff-containing open-faced dish being invertable and capable of establishing sealing engagement with said interconnecting member completing said food service and storage container foodstuff holding container assembly thereby defining a compartment holding said foodstuff and a compartment containing liquid, said foodservice and storage container foodstuff holding container assembly being invertable so as to drain said liquid into said foodstuff-containing compartment forming a mixture thereof therein, thereafter, said food service and storage foodstuff holding container assembly adapted to be disassembled permitting access to said mixture.

16. The food service and storage foodstuff holding container assembly forming kit according to claim 15 in which each of said open-faced dishes have a side-wall and at least one of said open-faced dishes have at least one unitary generally vertical cross-bridging wall dividing said open-faced dish into separate compartments, each said cross-bridging wall extending from the base of the open-faced dish to a point such that said cross-bridging wall is non-interferent with the interconnecting member when same is fully inserted frictionally engaged within said open-faced compartmentalized open-faced dish.

17. The food service and storage foodstuff holding container assembly forming kit according to claim 15 in which said cover members are selectable to cover selected ones of said unassembled open-faced dishes prior to formation of said container assembly.

18. The food service and storage foodstuff holding container assembly forming kit according to claim 15 in which said open-faced dishes include an interior circumferential shallow ledge located below said rims thereof at a location for supporting said interconnecting member seated within said selected open-faced dishes.

* * * * *